(12) United States Patent
Yang et al.

(10) Patent No.: US 11,528,524 B1
(45) Date of Patent: Dec. 13, 2022

(54) UNIVERSAL CONTROLLER

(71) Applicant: Sony Interactive Entertainment Inc., Tokyo (JP)

(72) Inventors: Rui Yang, San Mateo, CA (US); Hsin-Yi Chien, San Mateo, CA (US); Olga Rudi, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/490,685

(22) Filed: Sep. 30, 2021

(51) Int. Cl.
*H04N 21/422* (2011.01)
*H04N 21/45* (2011.01)

(52) U.S. Cl.
CPC ... *H04N 21/42225* (2013.01); *H04N 21/4222* (2013.01); *H04N 21/42222* (2013.01); *H04N 21/4532* (2013.01)

(58) Field of Classification Search
None
See application file for complete search history.

(56) References Cited

U.S. PATENT DOCUMENTS

2011/0312311 A1* 12/2011 Abifaker ........... H04M 1/72415
455/418
2012/0146918 A1* 6/2012 Kreiner .................. G08C 17/00
345/173

OTHER PUBLICATIONS

PCT Application PCT/US2022/034277 International Search Report and Written Opinion dated Aug. 4, 2022.

* cited by examiner

*Primary Examiner* — Samira Monshi
(74) *Attorney, Agent, or Firm* — Polsinelli LLP (57) ABSTRACT

Systems and methods for providing a universal remote control are disclosed. Control schemes for a plurality of remotely-controlled devices may be stored in memory of the universal remote control, where each of the control schemes includes a set of commands for a corresponding one of the remotely-controlled devices. Instructions for each command corresponding to one or more signals for the corresponding remotely-controlled device may be encoded. Based on a current orientation of a mobile device relative to a location of the remotely-controlled devices in a real-world environment, one of the remotely-controlled devices may be identified as being selected. Based on the stored control scheme for the selected remotely-controlled device a display for the mobile device may be generated, wherein the generated display includes the set of commands corresponding to the selected remotely-controlled device. A selection from the generated display of commands may be received. The selection corresponding to one or more signals based on the control scheme for the selected remotely-controlled device may be identified. The identified signals may be transmitted to the selected remotely-controlled device, wherein the transmitted signals include instructions executable by the selected remotely-controlled device to perform the selected command.

18 Claims, 6 Drawing Sheets

UNIVERSAL CONTROLLER

BACKGROUND OF THE INVENTION

1. Field of Invention

The present invention generally relates to providing a universal remote control of multiple remotely-controlled systems. More specifically, the present invention relates to providing dynamic controls capable of operating multiple remotely-controlled systems.

2. Description of the Related Art

Presently available entertainment systems include televisions, game consoles, stereo sound systems, Digital Video Disc (DVD) players, and Blu-ray players. Such entertainment systems are commonly found in a home, often in the same room. Each entertainment system may offer a variety of input methods to control the operations, including an embedded controller, remote control, or other device capable of communicating with the system. In the case that a user owns multiple systems located in the same room, multiple remote control devices may be likewise be present in the room. Remembering or determining the location of each such remote control device, which remote control device to use for which system, the location or combination of inputs on each remote control device, and managing the space for storage of each remote control device in the room may become cumbersome and inconvenient for a user.

Universal remote control devices have been developed to accommodate for the use of multiple entertainment systems. A universal remote control device may be used to operate multiple systems from the same input interface. Typically, the universal remote control device may require individual connection to each entertainment system. Typical connection methods for universal remote control may include inputting a system or device code matching the model of the individual entertainment system in order to enable communications between the universal remote control device and the entertainment system. While currently available universal remote control devices may replace multiple physical remote control devices, such physical universal remote control device may nevertheless be complicated or inefficient to use, as such physical universal remote control device may incorporate multiple input mechanisms associated with different remotely-controlled devices into a single physical interface, which may increase the number of interface elements and complicate usage of the device. The number of input mechanisms on a single universal control may make recalling the function of each input difficult, and failure to recall correctly may result in the wrong control instructions being provided (or the control instructions being provided to the wrong entertainment system). Additionally, a physical universal remote control device may become outdated when a device receives updates, or a new device is added that is not compatible with the universal remote control device.

Therefore, there is a need in the art for improved systems and methods of providing a universal remote control for multiple remotely-controlled devices.

SUMMARY OF THE CLAIMED INVENTION

Embodiments of the present invention include systems and methods for a universal remote control. Control schemes for a plurality of remotely-controlled devices may be stored in memory, where each of the control schemes includes a set of commands for a corresponding one of the remotely-controlled devices. Each command corresponding to one or more signals may encode instructions for the corresponding remotely-controlled device. One of the remotely-controlled devices may be identified as being selected based on a current orientation of a mobile device relative to a location of the selected remotely-controlled device in a real-world environment. A display for the mobile device may be generated based on the stored control scheme for the selected remotely-controlled device, wherein the generated display includes the set of commands corresponding to the selected remotely-controlled device. A selection from the generated display of commands may be received. The selection may be identified as corresponding to one or more signals based on the control scheme for the selected remotely-controlled device. The identified signals may be transmitted to the selected remotely-controlled device, wherein the transmitted signals include instructions executable by the selected remotely-controlled device to perform the selected command.

DETAILED DESCRIPTION

Embodiments of the present invention include systems and methods for a universal remote control. Control schemes for a plurality of remotely-controlled devices may be stored in memory, where each of the control schemes includes a set of commands for a corresponding one of the remotely-controlled devices. Each command corresponding to one or more signals may encode instructions for the corresponding remotely-controlled device. One of the remotely-controlled devices may be identified as being selected based on a current orientation of a mobile device relative to a location of the selected remotely-controlled device in a real-world environment. A display for the mobile device may be generated based on the stored control scheme for the selected remotely-controlled device, wherein the generated display includes the set of commands corresponding to the selected remotely-controlled device. A selection from the generated display of commands may be received. The selection may be identified as corresponding to one or more signals based on the control scheme for the selected remotely-controlled device. The identified signals may be transmitted to the selected remotely-controlled device, wherein the transmitted signals include instructions executable by the selected remotely-controlled device to perform the selected command.

The detailed description set forth below is intended as a description of various configurations of the subject technology and is not intended to represent the only configurations in which the technology may be practiced. The appended drawings are incorporated herein and constitute a part of the detailed description. The detailed description includes specific details for the purpose of providing a more thorough understanding of the technology. However, it will be clear and apparent that the technology is not limited to specific details set forth herein and may be practiced without these details. In some instances, structures and components are shown in block diagram form to avoid obscuring the concepts of the subject technology.

Figure 1:
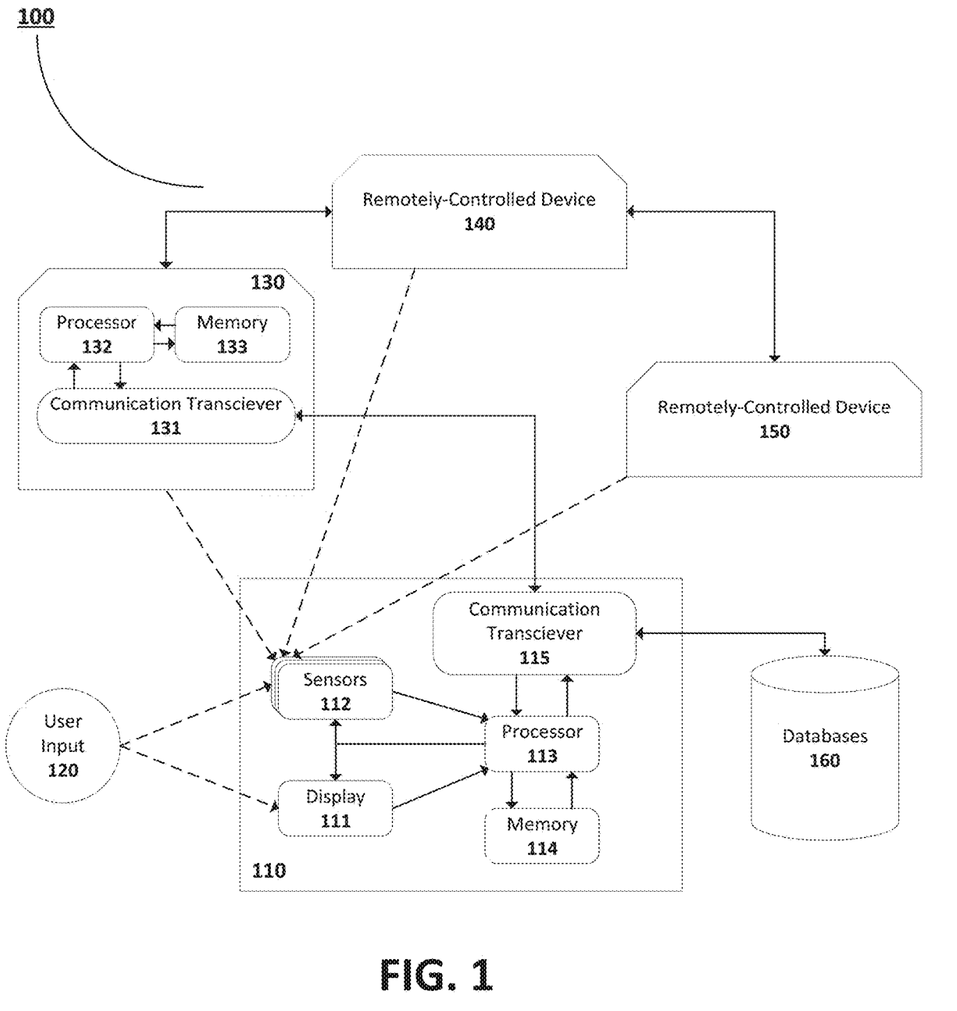
FIG. 1 illustrates an exemplary network environment in which a system for universal remote control of remotely-controlled devices may be implemented.

FIG. 1 illustrates an exemplary network environment in which a system for universal remote control of remotely-controlled devices may be implemented. The network environment 100 may include a mobile device 110 capable of executing a universal remote control application. The mobile device 110 may include a variety of presently available mobile devices, such as a smartphone, tablet, or entertainment system controller. The mobile device 110 may run using a variety of different operating systems (e.g., iOS, Android), applications or computing languages (e.g., C++, JavaScript), and may execute instructions to operate as the universal remote control.

The mobile device 110 may receive data through a variety of user input 120 from a user to operate functions of the universal remote control. User input 120 may include example such as a user touching or pressing a touchscreen display 111 of the mobile device 110 with a finger, stylus, or other touch-based tool. The mobile device 110 may also receive user input 120 via sensors 112 embedded in the mobile device, such as a microphone. Input collected by the display 111 and sensors 112 may be transmitted to a processor 113 of the mobile device 110. The processor 113 may execute instructions of the universal remote control stored in memory 114 to analyze user input 120. The processor 113 may encode instructions based on analysis of user input 120 and may transmit the instructions via a communication transceiver 115 to a variety of remotely-controlled devices 130, 140 or 150 in a real-world environment.

Remotely-controlled device 130 may be representative of any of remotely-controlled devices 140 or 150. Remotely-controlled devices 130, 140 or 150 may each include a communication transceiver 131 capable of interpreting encoded instructions received from the communication transceiver 115 of the mobile device 110. Instructions received by the transceiver 131 may be executed by a processor 132 to perform functions of the remotely-controlled device 130 based on operating system and application functions stored in memory 133. The remotely-controlled device 130 may also encode and transmit data to the mobile device 110 including metadata of the remotely-controlled device, such as the name of the device or the currently running application of the device. Each of the remotely-controlled devices 130, 140, and 150 may operate independently or in conjunction with one another through a variety of communication interfaces, such as an HDMI cable, display port cable, RGB cable, or local area network (LAN) WiFi connection.

Sensors 112 may capture various types of data regarding the mobile device 110 and remotely-controlled devices 130, 140, and 150 in the network environment 100, such as position data of the mobile device 110 and images or video of remotely-controlled devices 130, 140, and 150. The mobile device 110 may send and receive data from various databases 160 for use by the universal remote control, such as sensor data, control schemes for the universal remote control, and user profile data. Data communicated by databases 160 and by the mobile device 110 for the universal remote control is described in detail in FIGS. 2-5.

Figure 2:
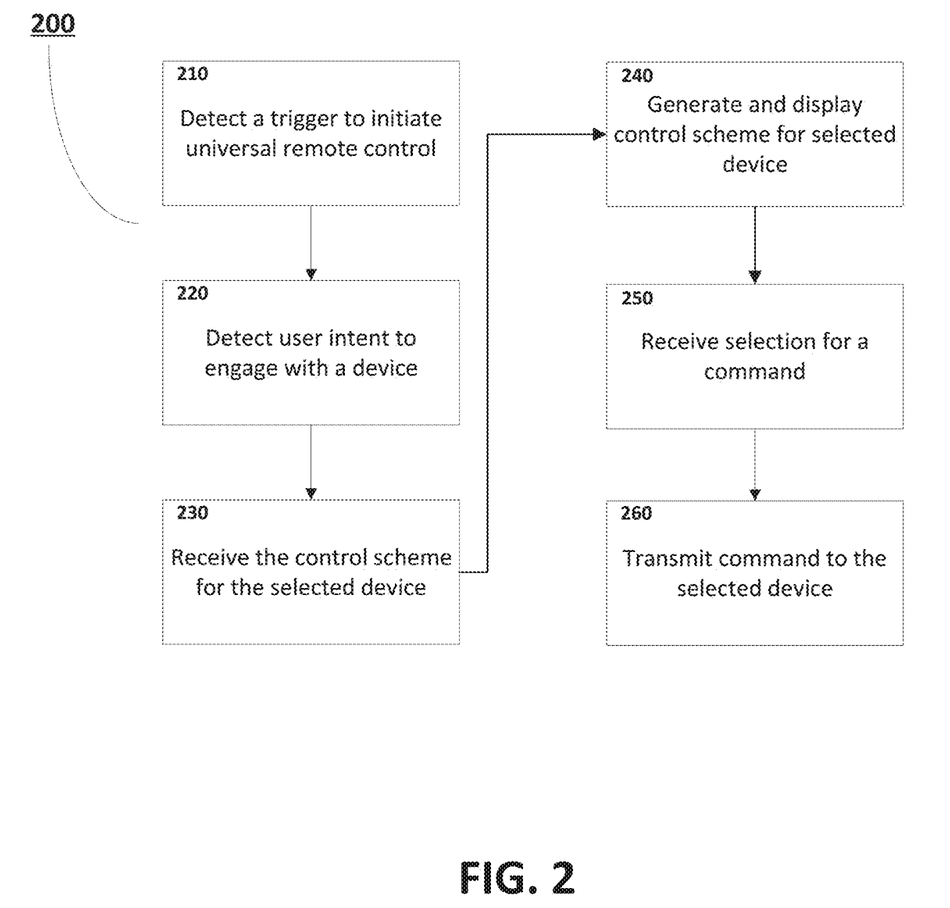
FIG. 2 is a flowchart illustrating an exemplary method for universal remote control of remotely-controlled devices.

FIG. 2 is a flowchart illustrating an exemplary method for universal remote control of remotely-controlled devices. The steps identified in process 200 of FIG. 2 are exemplary and may include various alternatives, equivalents, or derivations thereof including but not limited to the order of execution of the same. The steps of the process 200 of FIG. 2 and any alternative similar processes may be embodied in hardware or software including a computer-readable storage medium including instructions executable by the likes of a processor in a computing device. The exemplary process 200 illustrated in FIG. 2 may be performed repeatedly during the use of a universal remote control.

In step 210, a mobile device may detect a trigger to initiate use of a universal remote control. The mobile device may detect the trigger to initiate use of the universal remote control through various methods. In one embodiment, the trigger to initiate use of the universal remote control may include a user launching a universal remote control application on the mobile device. In other embodiments, the application for the universal remote control may currently be open and running in an idle state. In this case, the trigger to initiate use of the universal remote control may be detected by the mobile device when the application for the universal remote control changes from an idle state to an active state.

The mobile device may change an operation state of open applications from an active state to an idle state when the mobile device is configured to automatically turn off a screen or secure the mobile device after a period of time when not in use by locking the screen, or the user manually turns off the screen or locks the mobile device. In some cases, the application for the universal remote control may end the idle state and automatically change to an active state when the mobile device is reactivated. In other cases, the application for the universal remote control may require the user select the application for the universal remote control from a list of applications that are open in an idle state after the mobile device is reactivated, such as if a different application is already open and active when the mobile device reactivates. The mobile device may be reactivated through various methods, such as the user turning on the screen of the mobile device, unlocking the mobile device, or physically moving the mobile device. Physical movement of the mobile device may be detected by a variety of hardware sensors that collect data associated with a direction, an orientation, and a velocity or change in velocity of the mobile device, such as a gyroscope and an accelerometer.

Sensors, such as the gyroscope and the accelerometer, may collect data for a position of the mobile device during active use or during rest, and may track, store, and transmit the same data as time elapses. Positions associated with the mobile device during rest may be determined by the universal remote control analyzing received sensor data (e.g., a rotation value and a change in velocity value) and operation state information available from the mobile device related to inactivity of the mobile device (e.g., device screen: off; device lock: enabled).

For example, the universal remote control may receive sensor data from the gyroscope including a rotation value which may be associated with the mobile device lying flat on a table or other surface, and simultaneously receive sensor data from the accelerometer including a change in velocity value of zero. The universal remote control may repeatedly track rotation values and change in velocity values as time elapses and may determine that the mobile device is stationary or resting. The universal remote control may then set the operation state of the application for the universal remote control to an idle state based on inactivity.

In another example, the universal remote control may receive sensor data from the gyroscope including an initial rotation value which may be associated with the mobile device lying flat on a table or other surface, and simultaneously receive sensor data from the accelerometer including an initial change in velocity value of zero. The universal remote control may further receive a second rotation value and a second change in velocity value as time elapses that vary from the initial rotation value and the initial change in velocity value. The difference in rotation and change in velocity values may determine that the mobile device is being picked up by a user from a stationary or resting position and moving to an active use position. The universal remote control may then set the operation state of the application for the universal remote control to an active state based on the trigger associated with change from inactivity to active use of the mobile device.

In a different example, the universal remote control may receive sensor data from the gyroscope as time elapses including a rotation value which may be associated with the mobile device slightly rotating back and forth along a single axis. The universal remote control may analyze the rotation value over a time period as repeating a rotation, such as rotating along the Z axis of the mobile device increasing from approximately −25° to 25° and decreasing back to −25° over one second. The universal remote control may simultaneously receive sensor data over the same time period from the accelerometer including a change in velocity value increasing and decreasing within a small range, such as a velocity increasing by approximately 0.1 m/s$^2$ and decreasing back to zero. Further, the universal remote control may receive data from the mobile device about the operation state of the mobile device, such as data including a current security state of the mobile device to be in a locked state with the screen turned off. The universal remote control may determine that despite measurements that contain some movement, based on the locked state of the mobile device and oscillating rotation and velocity measurements the measured rotation and change in velocity indicate the user carrying the mobile device in a pocket or in hand while walking across the real-world environment. As such, the universal remote control may set the operation state of the application for the universal remote control to an idle state based on inactivity of the mobile device.

Based on the detection of an inactive use state for the mobile device, the universal remote control may continue to monitor and analyze sensor data while the application for the universal remote control remains in an idle state. Alternatively, based on detection of the trigger for the mobile device entering an active use state, the application for the universal remote control may be set to an active state and may execute various actions, described in detail in steps 220-260.

In step 220, the universal remote control may detect a user intent to engage with a remotely-controlled entertainment device. The detection of a trigger for active use of the mobile device in step 210 may execute instructions to enable imaging and signal sensors of the mobile device to record and transmit data to the universal remote control. In some embodiments, the universal remote control may already be actively interacting with a remotely-controlled entertainment device and may not require an additional trigger to enable sensor data collection. The universal remote control may receive data from various hardware sensors incorporated in the mobile device in addition to sensors that collect positional direction and orientation data described in step 210. In addition to positional hardware sensors, such as the gyroscope and accelerometer, the mobile device may include presently available imaging and signal sensor technology, such as a camera capable of recording video or still images, a light detection and ranging (LiDAR) detector capable of recording three-dimensional maps of objects and the environment, an infrared (IR) detector and emitter, or any combination therein. Each hardware sensor data may be utilized individually or in combination with one another by the universal remote control.

The universal remote control may execute instructions to analyze sensor data to determine the user intends to select a remotely-controlled entertainment device for interaction. Instructions executed to determine the user intent to interact with a remotely controlled entertainment device may combine real-time direction and orientation data with imaging and signal data, such as images or video from a camera, or three-dimensional maps from a LiDAR detector, to identify a selected remotely-controlled device. When the mobile device is in an active use state, such as being lifted from a table or being pointed towards a remotely-controlled device, the gyroscope and accelerometer sensors may receive changes in direction and orientation data. The universal remote control may continue to track changes in direction and orientation of the mobile device and may detect when direction and orientation changes have ceased, or the mobile device has steadied. Simultaneously, the universal remote control may capture imaging data of the real-world environment and detect a consistent steady feed images, video, or three-dimensional map data. Instructions executed by the universal remote control may interpret these changes in direction, orientation, and imaging data followed by a steadying of the same data to be correlated to the user intent to select a remotely-controlled device.

The universal remote control may store the direction, orientation and image data associated with the selected remotely-controlled device in memory. The universal remote control may recall known direction and orientation in future uses of the mobile device to expedite detecting the intent to select the remotely-controlled device.

The universal remote control detecting the user intent to select a remotely-controlled device may further execute instructions to identify the selected remotely-controlled device. The universal remote control may use imaging data, such as the images or video from a camera or three-dimensional maps from a LiDAR detector, to be compared to a database containing imaging data of known remotely-controlled device models. The universal remote control may match imaging data received from sensors to imaging data stored in the database to determine the device make and model.

In one embodiment, the camera may capture color images and video of the real-world environment, including the selected remotely-controlled device. The universal remote control may use image detection algorithms to isolate remotely-controlled devices in an image and separate the remotely-controlled devices from the real-world environment. An isolated image or video of the selected remotely-controlled device may include the image of the full device, lettering or numbering on the device, or a QR code on the device. The isolated image or video may be compared to an image or video database containing various angles of a variety of remotely-controlled device makes and models. The universal remote control may match the selected remotely-controlled device image to an image stored in the database and may identify the selected remotely-controlled device.

In a different embodiment, the LiDAR detector may scan and capture three-dimensional maps of the real-world environment including shapes of devices and the environment in the vicinity. The universal remote control may use three-dimensional analysis algorithms to isolate remotely-controlled devices from the surrounding real-world environment by detecting the shapes of features of a device. The universal remote control may separate and refine a three-dimensional map of the isolated selected remotely-controlled device. For example, a television placed on a table may be captured by the LiDAR detector and a three-dimensional map may be created where the base of the television lies flat on the table and the television and table may appear to be a single object. The universal remote control may detect the television during analysis of the three-dimensional map, and may extract the vectorized map of the television, separating it from the table at the base of the television and refining the map to normalize the base of the television. The isolated map of the remotely-controlled device may be compared to a database of three-dimensional maps for known device makes and models, and the universal remote control may match the isolated map of the remotely-controlled device to a corresponding model of device.

In addition to imaging data, the universal remote control may use an infrared (IR) detector and emitter equipped on the mobile device to detect remotely-controlled devices in the real-world environment. The IR detector and emitter may transmit infrared light pulses at frequencies in the infrared wavelength spectrum corresponding to entertainment systems capable of receiving IR signals. The universal remote control may store various datasets containing infrared binary signal signatures produced at different wavelengths for various corresponding entertainment devices, such as device power on or power off codes, device model connection program codes, or device input change codes. The IR detector and emitter may be used in tandem with a camera on the mobile device to detect when an IR signal has been received by an entertainment device by detecting changes in visible light emitted from a device in the direction the IR signal was transmitted from the universal remote control. For example, an IR signal may be transmitted from the universal remote control towards a television capable of receiving IR signals. The camera incorporated in the universal remote control may record the real-world environment in the direction the IR signal was transmitted. The camera may detect a change in visible light as the television powers on from light sources on the device, such as the screen or front panel LED indicators, confirming that the entertainment device received and processed the transmitted signal. In certain embodiments, sensor data processed by the universal remote control may detect various available remotely-controlled devices near one another in the real-world environment.

In some cases, the universal remote control may be currently interacting with a first remotely-controlled device associated with a first direction and orientation. The universal remote control may receive sensor data associated with a change in direction and orientation and may detect a user intent to interact with a second remotely-controlled device in a second direction and orientation. The universal remote control may store the direction and orientation of the second remotely-controlled device and may further execute later steps in process 200.

In a different example, the universal remote control may detect and identify multiple available remotely-controlled devices in the same direction, orientation, and imaging data. The universal remote control may execute analysis to detect, isolate, and identify each device. In such a case, the universal remote control may determine the user intent to interact with any combination of the remotely-controlled devices and may execute later steps in process 200 for interaction with one or more of the devices.

The universal remote control may track each identified remotely-controlled device in the vicinity of the real-world environment individually. Metadata may be stored in the universal remote control for each identified remotely-controlled device, such as the direction and orientation, imaging data, and the model name or number of the remotely-controlled device. The universal remote control may recall stored metadata for the available entertainment devices in later steps of process 200.

In step 230, the universal remote control may receive a control scheme associated with a selected device from step 220. The universal remote control may store various control schemes in memory for currently available remotely-controlled devices. Identification of a selected device and a controller trigger executed in steps 210 and 220 may initiate a search process performed by the universal remote control for a stored control scheme associated with the identified model of the selected device. In addition to searching the stored control schemes available in memory for currently available remotely-controlled devices, the universal remote control may receive a new control scheme from a database over a communication network, such as via an internet connection. The stored control schemes may be updated automatically or cleared from memory. The universal remote control may periodically check for updates to the control scheme or determine that a control scheme is no longer in use and may remove the control scheme from memory.

The control scheme received by the universal remote control for the identified corresponding remotely-controlled device may include a set of commands available for the device. Each command within the set of commands may include encoding instructions corresponding to various signals that may be transmitted to the identified selected remotely-controlled device in later steps of process 200.

In one embodiment, the control scheme received by the universal remote control may include all available commands to be displayed in a control scheme for the selected remotely-controlled device. In such a case, the control scheme and set of commands may include any commands the selected remotely-controlled device is capable of performing, regardless of the current operation of the device. For example, a surround sound system connected to a television or game console may include commands such as increasing or decreasing volume, updating a selected input device (e.g., switching operation of the surround sound from a television to a game console), powering on or off the device, updating the selected equalizer preset, and adjusting equalizer components, such as bass or treble levels. Each available command may appear within the control scheme received by the universal remote control, giving a user access to execute commands for all available operations of the remotely-controlled device.

In some embodiments, the universal remote control may provide nested control schemes based on current operation of the selected remotely-controlled device. Upon identifying the selected remotely-controlled device, the universal remote control may also identify a current use of the remotely-controlled device. The current use of the selected remotely-controlled device may be identified by signal data received by the universal remote control from the selected remotely-controlled device. The signal data from the selected remotely-controlled device may include metadata, such as a title of a currently running application, a title of a media content file, a current timestamp position during playback of a media content file, and other similar data. The universal remote control may filter a set of commands with respect to context of the metadata received for current operation of the selected remotely-controlled device, such that only relevant elements are displayed.

For example, the universal remote control may identify the current use of the selected remotely-controlled device by receiving a signal from an identified television including metadata corresponding to playing a movie from an application such as Netflix. The universal remote control may filter the control scheme of the television to provide a nested control scheme with a set of commands contextually applicable to the current use of playing a movie from a specific application. The universal remote control may exclude commands not currently in use by the remotely-controlled device from the set of commands, such as commands corresponding to a different application.

In step 240, the universal remote control may generate and display the control scheme for the selected remotely-controlled device. Based on the stored control scheme received in step 230, the universal remote control may generate and display a graphical user interface (GUI) corresponding to the set of commands for the selected-remotely controlled device. The universal remote control may identify each command in the set of commands and may associate instructions with each command.

For example, the universal remote control may generate a GUI including a set of commands corresponding to playback of a video media content file on a selected remotely-controlled game console. The set of commands may include commands for playing, pausing, fast forwarding, rewinding, or exiting the playback of the video media content file, and each command may be associated with corresponding encoded instructions. The universal remote control may also generate and display commands within the GUI applicable to the universal remote control, such as a command to access a user profile for the universal remote control. Exemplary GUIs including the above-described commands for a universal remote control are further detailed in FIGS. 3-5.

The universal remote control may update the displayed control scheme based on a variety of changes in sensor data or remotely-controlled device signal data. In one embodiment, the universal remote control may detect a change in the current application in use on the selected remotely-controlled device and may update the displayed control scheme based on the new application. In a different embodiment, the universal remote control may detect a change in direction and orientation from a first selected remotely-controlled device and may identify a second selected remotely-controlled device, subsequently updating the displayed control scheme to display commands for the second remotely-controlled device.

In some embodiments, the universal remote control may display one or more control schemes simultaneously with each displayed control scheme corresponding to a different remotely-controlled device. The universal remote control may display one or more control schemes based on remotely-controlled devices available in the direction and orientation of the mobile device. Additionally, the universal remote control may display one or more control schemes based on the current operation of a remotely-controlled device in conjunction with a different remotely-controlled device, such as a television in use in conjunction with an audio system. In some cases, the universal remote control may combine control schemes of remotely controlled devices that are working in conjunction with each other and display a unified control scheme containing commands from one or more remotely-controlled devices simultaneously.

In step 250, the universal remote control may receive a user input selecting a command from the GUI generated and displayed in step 240. The user input may include instructions to execute various other steps in process 200, such as selecting a different remotely controlled device to display, accessing a user profile of the universal remote control, or sending commands to a selected remotely-controlled device. In some embodiments, the user input may include various input methods available to the mobile device and corresponding to each command, such as pressing, tapping, and holding a touch-screen on the displayed command, or receiving voice input. The universal remote control may also receive a user selection for input per accessibility or disability settings on the mobile device that modify traditional inputs for use on the mobile device. Upon receiving the selection from the generated display of commands, the universal remote control may identify that the selection corresponds to various available signals capable of being encoded as instructions for the selected remotely-controlled device.

For example, the universal remote control may generate and display a set of commands for playback of a video currently playing on a television. The set of commands may include buttons displayed in the GUI for pausing, fast forwarding, rewinding, playing, and adjusting volume of the video. A user may tap on the displayed button corresponding to pausing the video, and the universal remote control may identify the user input as intent to pause playback of the video, and may further associate the user input to a signal available for the remotely-controlled device.

In another example, the user may press and hold on the displayed button corresponding to increasing volume of the video. In this example, the universal remote control may identify a signal corresponding to repeatedly increasing volume of the television and video associated with input holding the selection, and may repeatedly send the signal corresponding to increasing volume, terminating the signal when the hold input is released.

Yet in another example, the user may speak a phrase related to the displayed set of commands, such as, "fast forward." Speech may be detected by a microphone on the mobile device, and may be identified by the universal remote control as corresponding to the command for fast forwarding the playback of the video. The universal remote control may identify the command corresponding to the signal to fast forward indefinitely. In this case, the signal may be sustained and may only be terminated by additional user input, such as the user speaking the phrases, "pause", or "play", or the user tapping either the pause or play command in the displayed GUI.

In step 260, the universal remote control may transmit the identified signals in step 250. The identified signals may be transmitted to the selected remotely-controlled device as encoded instructions corresponding to commands executable by the selected remotely-controlled device. The selected remotely-controlled device may receive the instructions and decode the instructions to perform the selected command. The universal remote control may transmit signals based on user input while the direction and orientation detected in step 220 is maintained.

The steps identified in process 200 of FIG. 2 are exemplary and may include various alternatives, equivalents, or derivations thereof including but not limited to the order of execution of the same. The steps of the process 200 of FIG. 2 and any alternative similar processes may be embodied in hardware or software including a computer-readable storage medium including instructions executable by the likes of a processor in a computing device. The exemplary process 200 illustrated in FIG. 2 may be performed repeatedly during the use of a universal remote control. For example, the universal remote control may receive a selection for a command, transmit the command to the selected device and subsequently receive no change in orientation or direction from the mobile device, indicating the mobile device is continuing interaction with the selected device. Further, the universal remote control may receive a new selection for a different command and transmit the command to the selected device, repeating steps 250 and 260 indefinitely as required.

Figure 3:
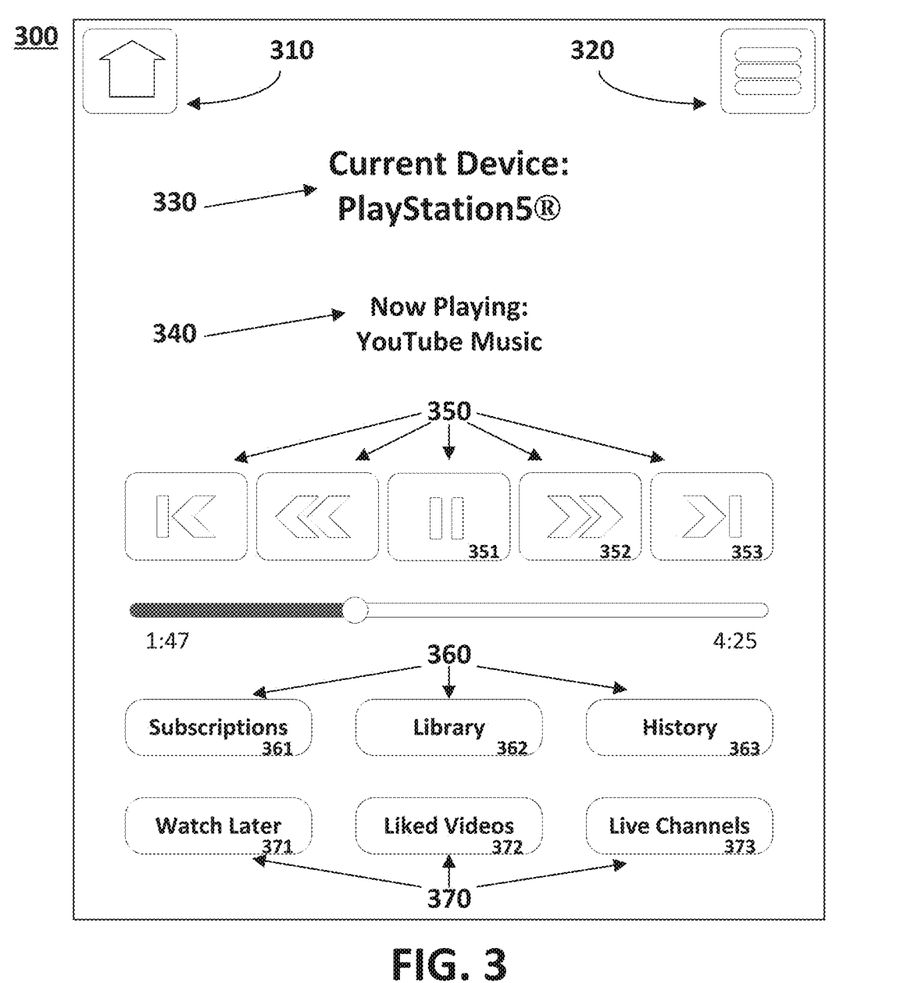
FIG. 3 illustrates an exemplary graphical user interface (GUI) associated with a universal remote control application used to remotely-control a first device.

FIG. 3 illustrates an exemplary graphical user interface (GUI) associated with a universal remote control application used to remotely-control a first device. A GUI for the universal remote control may include a variety of commands applicable to various functions of the universal remote control and commands applicable to various functions of a selected remotely-controlled entertainment device in use by the remote control.

The GUI 300 may include commands applicable to the universal remote control, such as a home button 310 or an expandable menu 320. The home button 310 or expandable menu 320 may include links to other GUI menus that a user may access to configure a user profile, preferred control options, and display themes for the universal remote control. Links for customization and preferences in the home button 310 or expandable menu 320 are explained in detail in FIG. 5.

GUI 300 may display commands and metadata of a device in use by the universal remote control, such as the name of the selected remotely-controlled device 330, an application currently in use 340, and application controls 350. The name of the selected remote controlled device 330 and application currently in use 340 may be displayed to a user to validate which device is currently being remote controlled in a variety of devices available in the real-world environment. The application controls 350 may include a set of commands for the selected device and/or in-use application, where each command in the set of commands corresponds to instructions that may be encoded and transmitted as a signal to the selected remotely-controlled device for each command upon a user input to execute a command.

For example, a selected remotely-controlled device may execute an application for playback of a music playlist, and the universal remote control may be used to transmit input commands to the selected remotely-controlled device to operate functions related to music playback. The application controls 350 of the music application displayed by the universal remote control may include commands, such as pause 351, fast forward 352, and next track 353. The command for pause 351, fast forward 352, and next track 353 may correspond to different sets of instructions for each command, and may be sent as signals to the selected remotely-controlled device upon receiving a user input, where the selected remotely-controlled device may interpret the instructions and execute a function of the music application.

The GUI 300 may further include frequently-used controls and related controls for a user and application of a selected remotely-controlled device. Frequently-used controls 360 may be tracked by the universal remote control for each time that the user selects a command for a selected remotely-controlled device and application. The universal remote control may further store the frequently-used controls of the user in a user profile. The frequently-used controls may be displayed as a shortcut and may be sorted based on the number of times the user has accessed the command over the duration of the user profiles use, where the most frequently-used commands appear before less frequently-used commands. For example, the user operating a music application may frequently access specific subscription channels 361, a music library 362, and a history of recently played music 363.

In addition to frequently-used controls 360, the universal remote control may display related controls 370 for the selected remotely-controlled device and application. Related controls 370 may include commands for the application or selected remotely-controlled device that may be accessed as a shortcut to functions that may otherwise require multiple inputs or selections of commands by the user. Related controls 370 may be customized based on user input and user preferences stored in the user profile. The related controls 370 may include commands not included in the frequently-used controls 360 as tracked by the user profile. For example, related controls 370 for the music application may include a list of videos or music tracks flagged by the user to watch later 371, a list of videos or music tracks the user has interacted with by leaving a positive social response such as a thumbs up 372, and a list of currently live broadcasting music channels similar to music played by the user. The universal remote control may receive data used to determine the related controls 370 of the application or device from a variety of social networks or connected applications via a communication interface connected to the internet on the user mobile device, such as the user profile associated with the music application.

In some implementations, the universal remote control may filter and organize the display of frequently-used controls and related controls. Such filtration and organization may include grouping such controls by type of remotely-controlled devices in the real-world environment. One or more groups of remotely-controlled devices may be located in different locations or areas of the real-world environment. The universal remote control may track and store data regarding specific groups of remotely-controlled devices used in different specified locations. For example, an entertainment system, television, and game console may be located in the living room and may be designated as part of the group associated with the living room. The user may provide a name to the group that may be displayed by the universal remote control, such as "Living Room," "J's Room," or "Pit of Despair." A map of the subsection of the real-world environment may be displayed in the GUI of the universal remote control as a frequently-used control shortcut command in order to filter for controls associated with the remotely-controlled devices in the desired room. In some instances, the user device 110 may be able to identify its current location within one of the designated subsections (e.g., room) associated with the user and automatically generate the display of device controls for the remotely-controlled devices in the identified location.

Figure 4:
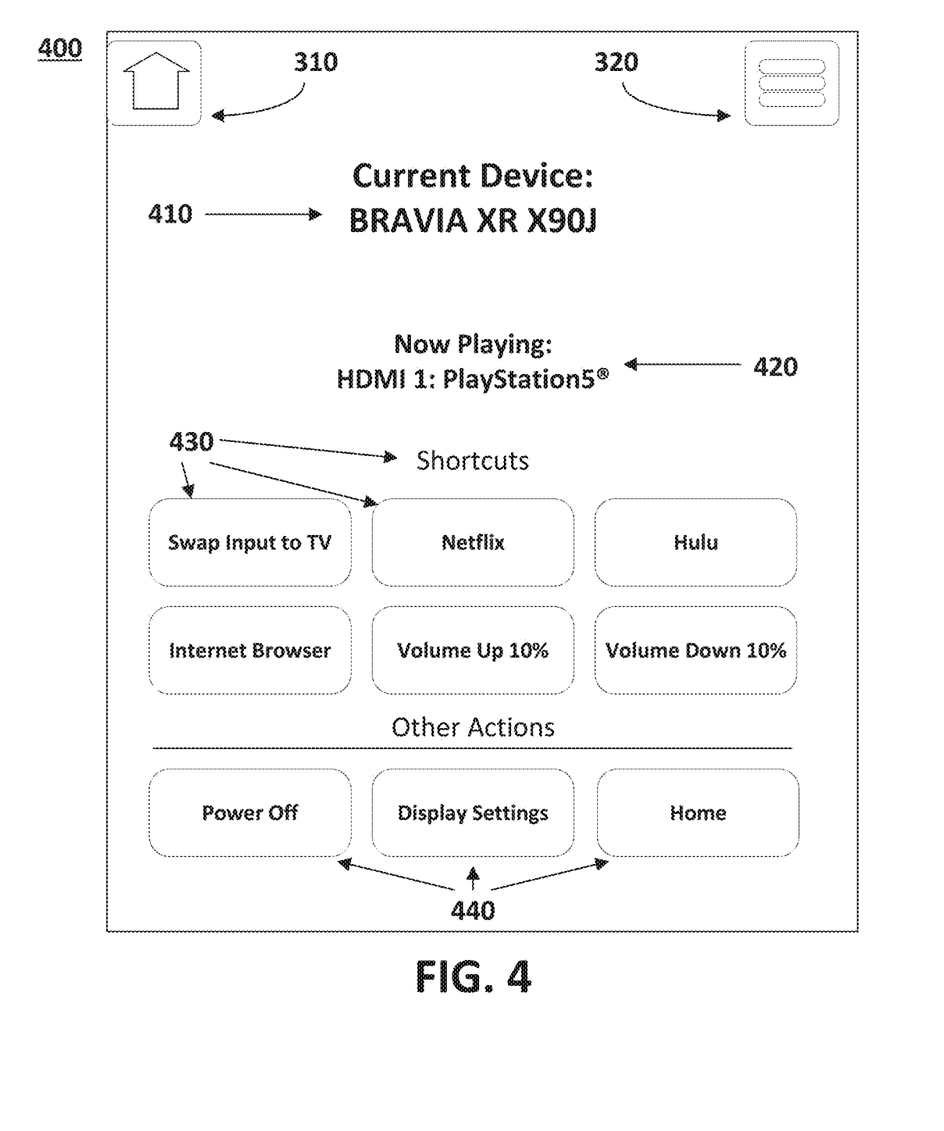
FIG. 4 illustrates another exemplary GUI associated with a universal remote control application used to remotely-control a second device.

FIG. 4 illustrates another exemplary GUI associated with a universal remote control application used to remotely-control a second device. A first GUI, such as the GUI 300 of FIG. 3, may automatically update and display a different second GUI, such as FIG. 4, upon the universal remote control receiving sensor data identifying a second selected remotely-controlled device different from the first remotely-controlled device associated with the first GUI. The second GUI 400 for the second remotely-controlled device may include controls that remain unchanged from the first GUI, such as controls for commands of the universal remote control like home 310 and the expandable menu 320. The universal remote control may retrieve available controls for the second remotely-controlled device from control schemes stored in memory. Further, the universal remote control may sort and display controls in the second GUI 400 for the second remotely-controlled device based on a variety of sensor data and user profile data, such as a currently running application on the second device and a customized setting of a user profile controlling the universal remote control. For example, the second GUI 400 may be associated with a television and may display metadata received in a signal from the television, such as a device model 410 and the currently running application 420. A television may provide metadata for the currently running application 420, such as the selected video input currently in use by the television.

The second GUI 400 may display a variety of controls for the second remotely-controlled device different from controls of the first remotely-controlled device based on the user profile. The second GUI 400 may include a list of favorite actions displayed as shortcuts 430 for the second remotely-controlled device. The list of favorite actions displayed as shortcuts 430 may include any combination of controls selected by the user in the user profile as favorite actions, and frequently-used controls 440 tracked by the universal remote control for the second remotely-controlled device. A preferred configuration of the control scheme may be stored in the user profile and tracked for each remotely-controlled device in the real-world environment, where the preferred configuration includes user preferences for favorite actions 430, frequently-used controls 440, and related controls to the currently running application of the selected remotely controlled device. The customized settings and the user profile may be updated in various ways, including the user selecting different customized settings, and the history of commands tracked as selected by the user while using the universal remote control. The user may access and select different customized settings from a menu of the universal remote control, such as the expandable menu 320.

Figure 5:
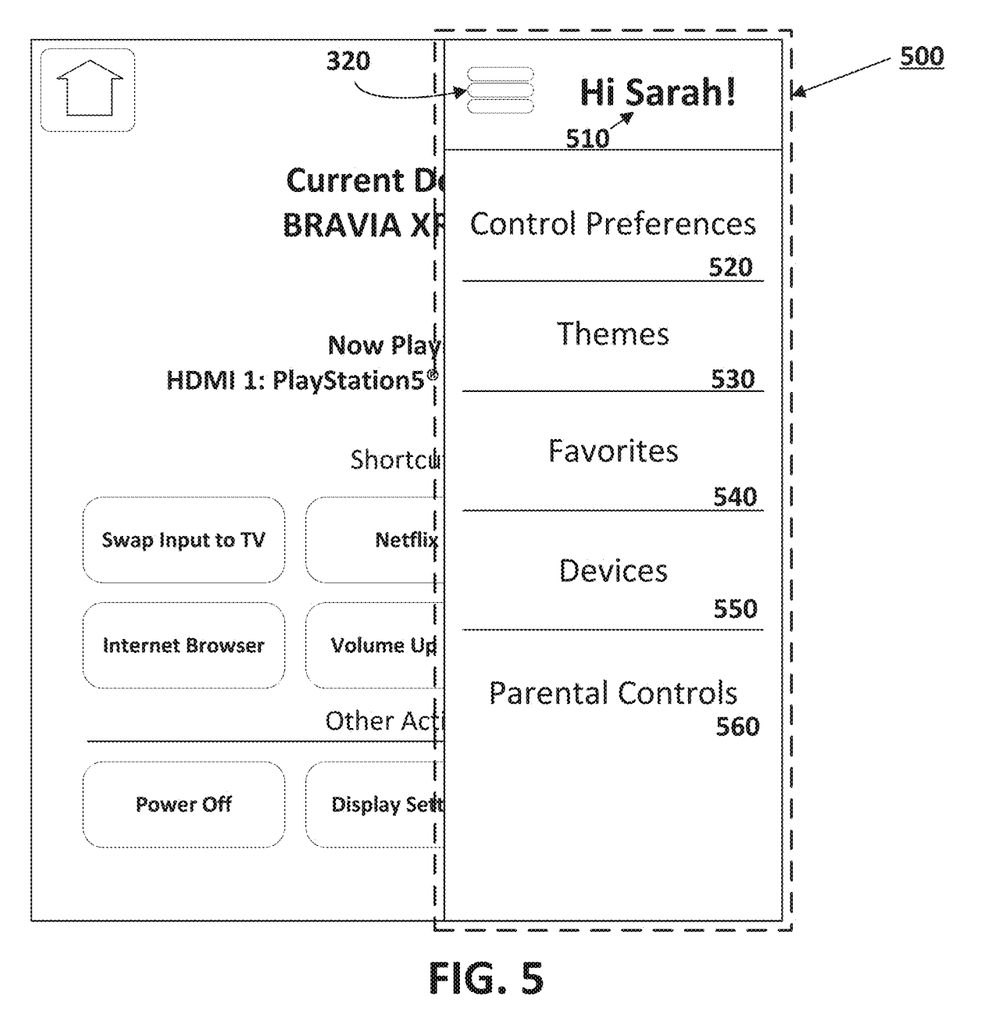
FIG. 5 illustrates an exemplary user profile GUI of a universal remote control application.

FIG. 5 illustrates an exemplary user profile GUI of a universal remote control application. In some embodiments, the universal remote control may display the configuration navigation menu in a variety of ways, such as a full-screen GUI separate from the selected remotely-controlled device GUI. In a different embodiment, the configuration navigation menu may be displayed by the universal remote control as a pop-out overlay 500, superimposed over the GUI of the selected remotely-controlled device when a user input selects the expandable navigation menu 320. The pop-out overlay 500 of the configuration navigation menu may display user information, such as a user name 510, and may display controls for navigating to different sections of configuration for the universal remote control. The user profile may also display additional information such as a usage history associated with the universal remote control and connected remotely-controlled devices. Controls for navigating to different sections of configuration may include a control preferences link 520, a control scheme themes link 530, a favorite actions link 540, a device management link 550, a parental controls link 560, and other configurable options. Each link in the configuration navigation menu may contain different settings and information that may be stored in memory of the universal remote control.

The control preferences link 520 may include a separate GUI displaying available control preferences for connected real-world remotely-controlled devices, such as customized settings for preferred commands and priority commands. For example, the control preferences link 520 may include a customized setting of a priority command for a remotely-controlled television, such as "Always display volume controls". The user may enable such an option to ensure when the selected remotely-controlled device is active, the universal remote control may always display volume commands regardless of the current application in use by the device.

The control scheme theme link 530 may include a separate GUI displaying customization settings for appearance and personalization of each control scheme and related remotely-controlled device. For example, the user may customize the appearance of different control schemes of remotely-controlled devices to display controls in a variety of colors, change sizes of control input buttons, change the font of displayed text, and various other personalization settings. Accessibility display options and themes within appearance customization may be provided, such as themes that increase the size of all controls to assist the visually-impaired. The universal remote control may further receive custom appearance settings for a control scheme from settings stored in memory associated with the user profile while interacting with the related remotely-controlled device.

The favorite actions link 540 may include a separate GUI displaying user selections for favorite actions for each remotely-controlled device. The favorite actions of the user may be customized by the user to include any actions available for each remotely-controlled device. Favorite actions selected by the user may be received and prioritized by the universal remote control for display in a control scheme during use of a related remotely-controlled device. In some embodiments, the favorite actions may also be based on a user history of most frequently-used actions as automatically tracked by the universal remote control.

The device management link 550 may include a separate GUI displaying detected available remotely-controlled devices in the real-world environment. The user may update settings for available remotely-controlled devices detected by the universal remote control, such as removing a device from use, ignoring a device to avoid future detection and use, or setting a nickname for a device. A nickname for a device may be used in place of the device model in the GUI displayed by the universal remote control. For example, the user may operate the universal remote control in a real-world environment containing two or more of the same device models, such as two video game consoles. The user may provide a nickname for one video game console, which may be a preferred device of the user. The universal remote control may display the nickname of the device in place of the device model during use, and the user may identify the correct device is selected, instead of the second device of the same model.

The parental controls link 560 may include a separate GUI displaying user preferences for device control priority in relation to other user devices in the real-world environment. Parental controls of the universal remote control may include device control priority settings such as setting a user type (e.g. Child, Parent), setting a priority level for a user, setting a maximum duration of use for the universal remote control or for a remotely-controlled device within a day, setting an end-of-use time of day, or blocking use of a device by a user in the real-world environment. The universal remote control may track other universal remote control users operating the same real-world remotely-controlled devices, and may be used to limit use of a device during a certain time of day, or block use of a device entirely. The parental controls of the universal remote control may include a password, passcode, or other authorization method to update included settings, once enabled.

The universal remote control may include a variety of functions for ease of use, accessibility, remotely-controlled device connection control, and device preferences not limited to the illustration of FIG. 5. In one embodiment, the universal remote control may provide a remotely-controlled device locator function. The remotely-controlled device locator may be displayed in the GUI of the universal remote control for a previously used remotely-controlled device and may include a control command such as a "Find Me" command. Upon user selection of the command, the universal remote control may execute the remotely-controlled device locator function and may transmit a signal to the selected remotely-controlled device causing the remotely-controlled device to perform an alert, such as lighting up the display of the remotely-controlled device or playing a sound. In a different example, the selected remotely-controlled device may be unable to light up or play a sound. In such a case, the universal remote control may point the user in the direction of the remotely-controlled device in a variety of ways, such as displaying a directional arrow pointing towards the remotely-controlled device or vibrating the mobile device in the direction of the remotely-controlled device to guide the user to the location.

Figure 6:
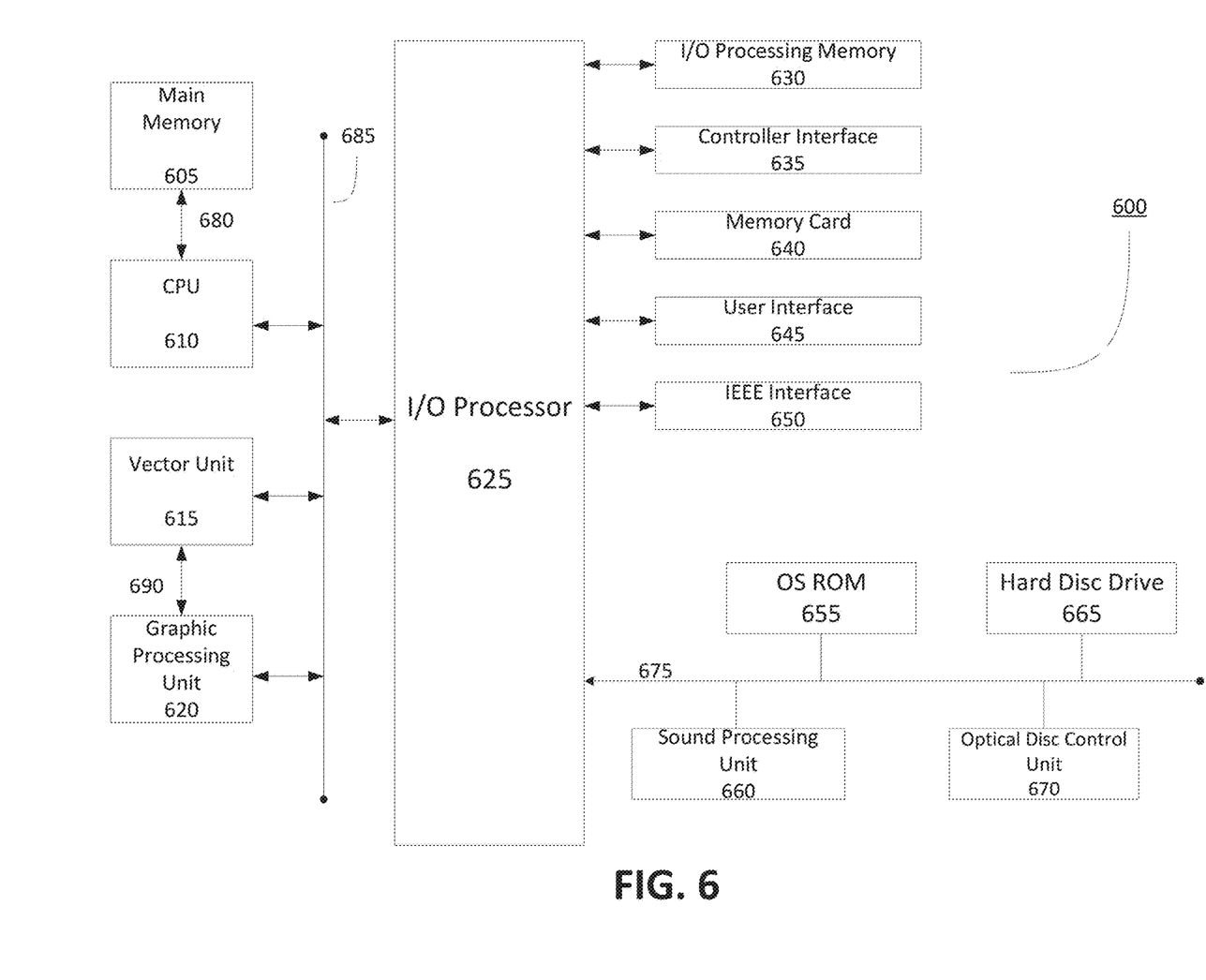
FIG. 6 is a block diagram of an exemplary electronic entertainment system that may be used in embodiments of the present invention.

FIG. 6 is a block diagram of an exemplary electronic entertainment system 600. The entertainment system 600 of FIG. 6 includes a main memory 605, a central processing unit (CPU) 610, vector unit 615, a graphics processing unit 620, an input/output (I/O) processor 625, an I/O processor memory 630, a controller interface 635, a memory card 640, a Universal Serial Bus (USB) interface 645, and an IEEE interface 650. The entertainment system 600 further includes an operating system read-only memory (OS ROM) 655, a sound processing unit 660, an optical disc control unit 670, and a hard disc drive 665, which are connected via a bus 675 to the I/O processor 625.

Entertainment system 600 may be an electronic game console. Alternatively, the entertainment system 600 may be implemented as a general-purpose computer, a set-top box, a hand-held game device, a tablet computing device, or a mobile computing device or phone. Entertainment systems may contain more or less operating components depending on a particular form factor, purpose, or design.

The CPU 610, the vector unit 615, the graphics processing unit 620, and the I/O processor 625 of FIG. 6 communicate via a system bus 685. Further, the CPU 610 of FIG. 6 communicates with the main memory 605 via a dedicated bus 680, while the vector unit 615 and the graphics processing unit 620 may communicate through a dedicated bus 690. The CPU 610 of FIG. 6 executes programs stored in the OS ROM 655 and the main memory 605. The main memory 605 of FIG. 6 may contain pre-stored programs and programs transferred through the I/O Processor 625 from a CD-ROM, DVD-ROM, or other optical disc (not shown) using the optical disc control unit 670. I/O Processor 625 of FIG. 6 may also allow for the introduction of content transferred over a wireless or other communications network (e.g., 4$, LTE, 3G, and so forth). The I/O processor 625 of FIG. 6 primarily controls data exchanges between the various devices of the entertainment system 600 including the CPU 610, the vector unit 615, the graphics processing unit 620, and the controller interface 635.

The graphics processing unit 620 of FIG. 6 executes graphics instructions received from the CPU 610 and the vector unit 615 to produce images for display on a display device (not shown). For example, the vector unit 615 of FIG. 6 may transform objects from three-dimensional coordinates to two-dimensional coordinates, and send the two-dimensional coordinates to the graphics processing unit 620. Furthermore, the sound processing unit 660 executes instructions to produce sound signals that are outputted to an audio device such as speakers (not shown). Other devices may be connected to the entertainment system 600 via the USB interface 645, and the IEEE 694 interface 650 such as wireless transceivers, which may also be embedded in the system 600 or as a part of some other component such as a processor.

A user of the entertainment system 600 of FIG. 6 provides instructions via the controller interface 635 to the CPU 610. For example, the user may instruct the CPU 610 to store certain game information on the memory card 640 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method of providing a universal remote control, the method comprising:
    storing one or more control schemes in memory associated with a plurality of remotely-controlled devices, wherein each of the control schemes includes a set of commands for a corresponding one of the remotely-controlled devices, each command corresponding to a set of one or more signals encoding instructions for the corresponding remotely-controlled device;
    ranking the control schemes;
    identifying one of the remotely-controlled devices as being selected by a mobile device, wherein identifying the selected remotely-controlled device is based on the ranking;
    generating a display for the mobile device based on at least one of the stored control schemes associated with the selected remotely-controlled device, wherein the generated display includes commands from the set corresponding to the selected remotely-controlled device;
    receiving a selection of one of the commands in the generated display;
    identifying that the selected command corresponds to the set of signals in accordance with the control schemes for the selected remotely-controlled device; and
    transmitting the identified signals to the selected remotely-controlled device, wherein the transmitted signals include instructions executable by the selected remotely-controlled device to perform the selected command.

2. The method of claim 1, wherein identifying the selected remotely-controlled device is further based on a current orientation or direction of the mobile device relative to a location of the selected remotely-controlled device in a real-world environment.

3. The method of claim 2, further comprising identifying another selection of a second device from among the plurality of devices based on a change in the current orientation or direction of the mobile device in the real-world environment, and automatically updating the generated display based on one of the stored control schemes identified as being associated with the second device.

4. The method of claim 1, further comprising triggering initiation of a universal remote control application on the mobile device based on a change in orientation or direction of the mobile device in a real-world environment.

5. The method of claim 1, further comprising storing a user profile that includes one or more customized settings associated with at least one of the control schemes.

6. The method of claim 1, further comprising retrieving one or more of the control schemes from a database.

7. The method of claim 6, further comprising identifying a model or another identifier of the selected remotely-controlled device based on a search of the database.

8. The method of claim 1, wherein a plurality of the remotely-controlled devices are identified as being selected, and wherein the generated display includes a plurality of control schemes corresponding to the selected remotely-controlled devices.

9. The method of claim 8, wherein the selected remotely-controlled devices are identified as being selected based on being located within a close proximity to at least one other selected remotely-controlled device.

10. The method of claim 8, further comprising automatically adjusting dimensions of display portions corresponding to each of the control schemes associated with the selected remotely-controlled devices.

11. The method of claim 10, wherein adjusting the dimensions of the display portions corresponding to each of the control schemes associated with the selected remotely-controlled devices is based on user customization input.

12. The method of claim 8, further comprising receiving a selection of a display portion corresponding to one of the control schemes within the generated display, and updating the generated display based on the selected display portion.

13. The method of claim 8, further comprising storing data in a user profile indicating that the remotely-controlled devices are used together, wherein the remotely-controlled devices are identified as being selected when at least one of the remotely-controlled devices is selected.

14. The method of claim 1, further comprising generating a menu display of the control schemes, wherein the control schemes are presented within the menu display in accordance with the ranking.

15. The method of claim 1, wherein ranking the control schemes is based on one or more user preferences stored in a user profile.

16. The method of claim 1, wherein ranking the control schemes is based on locations of the remotely-controlled devices relative to a current orientation or direction of the mobile device.

17. A system for providing a universal remote control, the system comprising:
    memory that stores one or more control schemes associated with a plurality of remotely-controlled devices, wherein each of the control schemes includes a set of commands for a corresponding one of the remotely-controlled devices, each command corresponding to a set of one or more signals encoding instructions for the corresponding remotely-controlled device;
    a processor that executes instructions stored in memory, wherein the processor executes the instructions to:
    rank the control schemes;
    identify one of the remotely-controlled devices as being selected, wherein identifying the selected remotely-controlled device is based on the ranking; and
    generate a display for a mobile device based on at least one of the stored control schemes associated with the selected remotely-controlled device, wherein the generated display includes commands from the set corresponding to the selected remotely-controlled device;
    a user interface that receives a selection of one of the commands in the generated display, wherein the processor identifies that the selected command corresponds to the set of signals in accordance with the control schemes for the selected remotely-controlled device; and
    a signal interface that transmits the identified signals to the selected remotely-controlled device, wherein the transmitted signals include instructions executable by the selected remotely-controlled device to perform the selected command.

18. A non-transitory computer-readable storage medium, having embodied thereon a program executable by a processor to perform a method for providing a universal remote control, the method comprising:
    storing one or more control schemes in memory associated with a plurality of remotely-controlled devices, wherein each of the control schemes includes a set of commands for a corresponding one of the remotely-controlled devices, each command corresponding to a set of one or more signals encoding instructions for the corresponding remotely-controlled device;

ranking the control schemes;

identifying one of the remotely-controlled devices as being selected, wherein identifying the selected remotely-controlled device is based on the ranking;

generating a display for a mobile device based on at least one of the stored control schemes associated with the selected remotely-controlled device, wherein the generated display includes commands from the set corresponding to the selected remotely-controlled device;

receiving a selection of one of the commands in the generated display;

identifying that the selected command corresponds to the set of signals in accordance with the control schemes for the selected remotely-controlled device; and transmitting the identified signals to the selected remotely-controlled device, wherein the transmitted signals include instructions executable by the selected remotely-controlled device to perform the selected command.

* * * * *